United States Patent
Lee et al.

(10) Patent No.: US 12,107,274 B2
(45) Date of Patent: Oct. 1, 2024

(54) ELECTRODE CURRENT COLLECTOR COMPRISING A HEAT-PRESSURE CONVERSION LAYER BETWEEN TWO OR MORE METAL FOILS, ELECTRODE COMPRISING THE SAME, AND LITHIUM SECONDARY BATTERY

(71) Applicant: LG Chem, Ltd., Seoul (KR)

(72) Inventors: Hanyoung Lee, Daejeon (KR); Suk Woo Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 878 days.

(21) Appl. No.: 17/271,919

(22) PCT Filed: Jul. 24, 2020

(86) PCT No.: PCT/KR2020/009792
§ 371 (c)(1),
(2) Date: Feb. 26, 2021

(87) PCT Pub. No.: WO2021/054596
PCT Pub. Date: Mar. 25, 2021

(65) Prior Publication Data
US 2021/0391582 A1     Dec. 16, 2021

(30) Foreign Application Priority Data

Sep. 19, 2019 (KR) .................. 10-2019-0115356

(51) Int. Cl.
*H01M 4/66* (2006.01)
*H01M 4/38* (2006.01)
(Continued)

(52) U.S. Cl.
CPC .......... *H01M 4/667* (2013.01); *H01M 4/386* (2013.01); *H01M 4/505* (2013.01); *H01M 4/525* (2013.01);
(Continued)

(58) Field of Classification Search
CPC ...... H01M 4/661; H01M 4/664; H01M 4/665; H01M 4/666; H01M 4/667; H01M 4/668; H01M 10/052; H01M 10/0525
See application file for complete search history.

(56) References Cited

U.S. PATENT DOCUMENTS 5,521,029 A     5/1996 Fiorino et al.
8,048,551 B2 *  11/2011 Cho ..................... H01M 50/578
                                                429/61
(Continued)

FOREIGN PATENT DOCUMENTS

CN      105514521 A    4/2016
EP      3496186 A1     6/2019
(Continued)

OTHER PUBLICATIONS

International Search Report for Application No. PCT/KR2020/009792, mailed Oct. 29, 2020, pp. 1-2.
(Continued)

*Primary Examiner* — Jeremiah R Smith
(74) *Attorney, Agent, or Firm* — Lerner David LLP

(57) ABSTRACT

An electrode current collector for a lithium secondary battery includes two or more metal foil layers, and a heat-pressure conversion layer positioned between the two or more metal foil layers, wherein the heat-pressure conversion layer includes a heat-pressure exchange ceramic material, a conductive material, and an adhesive. An electrode including the current collector, and a lithium secondary battery including the electrode are also provided.

16 Claims, 8 Drawing Sheets

(51) Int. Cl.
  *H01M 4/505*  (2010.01)
  *H01M 4/525*  (2010.01)
  *H01M 10/0525*  (2010.01)
  *H01M 4/02*  (2006.01)

(52) U.S. Cl.
  CPC .......... *H01M 4/661* (2013.01); *H01M 4/664* (2013.01); *H01M 10/0525* (2013.01); *H01M 2004/028* (2013.01); *H01M 4/665* (2013.01); *H01M 4/666* (2013.01)

(56) References Cited

U.S. PATENT DOCUMENTS

| | | | |
|---|---|---|---|
| 2007/0105014 A1* | 5/2007 | Shin | H01M 50/124 |
| | | | 429/152 |
| 2008/0254355 A1 | 10/2008 | Muraoka et al. | |
| 2008/0261113 A1* | 10/2008 | Huang | H01M 4/485 |
| | | | 429/221 |
| 2009/0325066 A1 | 12/2009 | Kwon et al. | |
| 2012/0171569 A1* | 7/2012 | Jones | C04B 35/62635 |
| | | | 252/500 |
| 2015/0288029 A1* | 10/2015 | Lv | H01M 50/449 |
| | | | 429/200 |
| 2015/0340699 A1 | 11/2015 | Chami et al. | |
| 2016/0237331 A1* | 8/2016 | Ohkoshi | C01G 23/04 |
| 2016/0254572 A1* | 9/2016 | Yu | H01M 4/661 |
| | | | 429/126 |
| 2019/0048243 A1 | 2/2019 | Ohkoshi et al. | |
| 2020/0083537 A1* | 3/2020 | Anandan | H01M 4/622 |
| 2020/0388840 A1* | 12/2020 | Horikawa | H01M 4/131 |
| 2021/0376432 A1* | 12/2021 | Fan | H01M 50/574 |

FOREIGN PATENT DOCUMENTS

| | | |
|---|---|---|
| JP | H09316576 A | 12/1997 |
| JP | 2009059571 A | 3/2009 |
| JP | 4967267 B2 | 7/2012 |
| JP | 2013251421 A | 12/2013 |
| JP | 6080026 B2 | 2/2017 |
| JP | 6183935 B1 | 8/2017 |
| JP | 2018092804 A | 6/2018 |
| KR | 100355999 B1 | 12/2002 |
| KR | 100654567 B1 | 12/2006 |
| KR | 20080092281 A | 10/2008 |
| KR | 20120008259 A | 1/2012 |
| KR | 101503458 B1 | 3/2015 |
| KR | 20150032268 A | 3/2015 |
| KR | 20150114862 A | 10/2015 |
| WO | 2018062172 A1 | 4/2018 |
| WO | 2019054259 A1 | 3/2019 |

OTHER PUBLICATIONS

Oganov A. R. et al: "The high-pressure phase of alumina and implications for Earth's D" layer", Proceedings of the National Academy of Sciences, vol. 102, No. 31, Aug. 2, 2005, pp. 10828-10831.
Partial European search report for Application No. EP 2082957, dated Jul. 29, 2021, 12 pages.

* cited by examiner

ELECTRODE CURRENT COLLECTOR COMPRISING A HEAT-PRESSURE CONVERSION LAYER BETWEEN TWO OR MORE METAL FOILS, ELECTRODE COMPRISING THE SAME, AND LITHIUM SECONDARY BATTERY

CROSS-REFERENCE TO RELATED APPLICATIONS

This application is a national phase entry under 35 U.S.C. § 371 of International Application No. PCT/KR2020/009792, filed on Jul. 24, 2020, which claims the benefit of Korean Patent Application No. 10-2019-0115356, filed on Sep. 19, 2019, the disclosures of which are incorporated herein by reference in their entirety.

TECHNICAL FIELD

The present disclosure relates to an electrode current collector comprising a heat-pressure conversion layer between two or more metal foils, an electrode comprising the same, and a lithium secondary battery.

BACKGROUND ART

Recently, along with the increase of the technological development and demand for a mobile device, demand for a secondary battery capable of charging and discharging as an energy source rapidly increases, and accordingly, many researches of the battery capable of meeting a variety of needs are emerging. Further, the secondary battery has attracted considerable attention as a power source for electric vehicles (EV), hybrid electric vehicles (HEV), and plug-in hybrid electric vehicles (Plug-in HEV), which have been developed to solve problems, such as air pollution, caused by existing gasoline and diesel vehicles using fossil fuels.

Therefore, an electric vehicle (EV), which is driven only by a secondary battery, and a hybrid electric vehicle (HEV), which combines a conventional engine with a secondary battery, have been developed and some thereof have been commercialized. A nickel-metal hydride (Ni-MH) secondary battery has been mainly used as the power source of EV and HEV. Recently, however, studies using lithium secondary batteries having high energy density, high discharge voltage and output stability have been actively conducted, and some thereof have been commercialized.

Such a lithium secondary battery is manufactured by a process in which an electrode slurry containing an electrode active material is applied to an electrode current collector, dried, and rolled to produce an electrode, and an electrode assembly in which a separator is interposed between these electrodes is built in a battery case together with an electrolyte.

Here, the electrode is a positive electrode or a negative electrode, and as for the electrode active material, a carbon material is mainly used as the negative electrode active material, and use of lithium metal, sulfur compounds, and the like is also considered. Further, lithium-containing cobalt oxide ($LiCoO_2$) is mainly used as the positive electrode active material. In addition, use of lithium-containing manganese oxides such as $LiMnO_2$ having a layered crystal structure and $LiMn_2O_4$ having a spinel crystal structure, and lithium-containing nickel oxide ($LiNiO_2$) are also considered.

In recent years, high energy density, long life, durability and the like are important issues. Thus, lithium nickel-cobalt-manganese oxide is used in a large amount as a lithium nickel-based oxide exhibiting excellent performance in terms of these performances.

However, the lithium secondary battery containing such an active material has a problem that rapid charging performance is insufficient.

Meanwhile, if the charging current density is increased in order to improve the rapid charging performance, there is a problem that lithium plating occurs at the negative electrode, and thus there is a limit in increasing the charging current density.

Accordingly, there is a high need for a technology that can solve the above problems and improve the rapid charging performance of the lithium secondary battery.

DETAILED DESCRIPTION OF THE INVENTION

Technical Problem

The present disclosure has been directed to solve the above-mentioned problems of the prior arts and other technical problems that have yet to be resolved.

Specifically, it is an object of the present disclosure to provide an electrode current collector capable of improving the rapid charging performance of a secondary battery by generating heat by the operation of the secondary battery to raise the temperature of the battery.

Technical Solution

In order to achieve the above object, according to an embodiment of the present disclosure, there is provided an electrode current collector for a lithium secondary battery, the electrode current collector comprising: two or more metal foil layers, and a heat-pressure conversion layer positioned between the two or more metal foil layers, wherein the heat-pressure conversion layer includes a heat-pressure exchange ceramic material, a conductive material, and an adhesive.

In one embodiment, the heat-pressure conversion layer may be interposed between two or more flat metal foil layers.

For example, the electrode current collector may be configured to include a lower current collector, a first heat-pressure conversion layer located on the lower current collector, an intermediate current collector located on the first heat-pressure conversion layer, a second heat-pressure conversion layer located on the intermediate current collector, and an upper current collector located on the second heat-pressure conversion layer.

In another embodiment, at least one metal foil layer of the two or more metal foil layers has a concavo-convex portion including a convex portion and a concave portion on the surface thereof, and the heat-pressure conversion layer may be formed in the concave portion.

At this time, the convex portion and the concave portion may be formed at regular intervals.

Meanwhile, the heat-pressure exchange ceramic material may be trititanium pentoxide, and the lambda-trititanium pentoxide and beta-trititanium pentoxide can undergo a reversible phase transition by heat and pressure.

Specifically, the heat-pressure exchange ceramic material undergoes a phase transition from lambda-trititanium pentoxide to beta-trititanium pentoxide by pressing, and it can undergo a phase transition from beta-trititanium pentoxide to lambda-trititanium pentoxide by heat absorption.

The heat-pressure conversion layer may have a thickness of 5 to 50 μm.

The two or more metal foil layers may be made of mutually identical metals. For example, the two or more metal foil layers are made of Al metal, the electrode current collector may be a positive electrode current collector, the two or more metal foil layers are made of Cu metal, and the electrode current collector may be a negative electrode current collector.

The two or more metal foils may have a thickness of 10 to 100 μm, respectively.

Meanwhile, according to another embodiment of the present disclosure, there is provided an electrode in which an electrode mixture containing an electrode active material, a binder and a conductive material is formed on at least one surface of the electrode current collector.

Here, the electrode active material may include a lithium transition metal oxide represented by the following chemical formula 1.

$$Li_aNi_{1-x-y}Mn_xCo_yO_{2-b}A_b \qquad (1)$$

wherein,

A is an oxygen-substituted halogen, 1.00≤a≤1.05, 0.1≤x≤0.6, 0.1≤y≤0.6, and 0≤b≤0.1.

Further, the electrode active material may include one or more silicon-based materials selected from the group consisting of Si/C composite, $SiO_x$(0<x<2), metal-doped $SiO_x$ (0<x<2), $SiO_x$/C (0<x<2), pure Si, and Si-alloy.

According to yet another embodiment of the present disclosure, there is provided a lithium secondary battery in which an electrode assembly containing the electrode is built in a prismatic or cylindrical battery case made of metal together with a lithium-containing non-aqueous electrolyte.

DETAILED DESCRIPTION OF THE EMBODIMENTS

According to the present disclosure, there is provided an electrode current collector for a lithium secondary battery, the electrode current collector comprising two or more metal foil layers, and a heat-pressure conversion layer positioned between the two or more metal foil layers, wherein the heat-pressure conversion layer includes a heat-pressure exchange ceramic material, a conductive material, and an adhesive.

The electrode current collector is not limited as long as it has a structure including a heat-pressure conversion layer between the two or more metal foil layers, and various structures are possible.

As one example, the heat-pressure conversion layer may be interposed between two or more flat metal foil layers. In other words, it may be a shape interposing as one layer between two or more metal foil layers.

Specifically, this is a structure in which a heat-pressure conversion layer is interposed as one layer between two metal foil layers, and may be composed of a lower current collector, a heat-pressure conversion layer located on the lower current collector, and an upper current collector located on the heat-pressure conversion layer.

Here, and hereinafter, these are terms for dividing the structure including the lower current collector, the upper current collector, the intermediate current collector, etc., and correspond to the metal foil layer.

Figure 1:
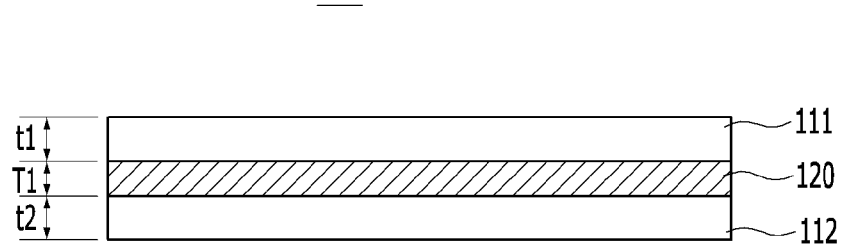
FIG. 1 is a vertical cross-sectional view of an electrode current collector according to an embodiment of the present disclosure.

FIG. 1 schematically shows a vertical cross-sectional view of such an electrode current collector.

Referring to FIG. 1, the electrode current collector 100 according to the present disclosure has a structure in which a heat-pressure conversion layer 120 is interposed between two metal foil layers 111 and 112.

Specifically, the electrode current collector is composed of a lower current collector 112, a heat-pressure conversion layer 120 located on the lower current collector 112, and an upper current collector 111 located on the heat-pressure conversion layer 120.

Alternatively, the electrode current collector may have a structure in which the metal foil layers are three or more, the heat-pressure conversion layers are two or more, and the heat-pressure conversion layers are interposed between the metal foil layers.

Figure 2:
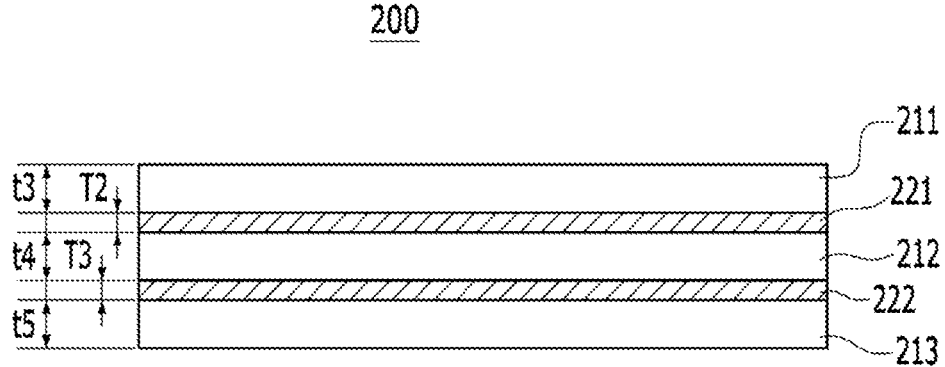
FIG. 2 is a vertical cross-sectional view of an electrode current collector according to another embodiment of the present disclosure.

FIG. 2 schematically shows a vertical cross-sectional view of the electrode current collector.

Referring to FIG. 2, the electrode current collector 200 according to the present disclosure is composed of a structure including a lower current collector 213, a first heat-pressure conversion layer 222 located on the lower current collector 213, an intermediate current collector 212 located on the first heat-pressure conversion layer 222, a second heat-pressure conversion layer 221 located on the intermediate current collector 212, and an upper current collector 211 located on the second heat-pressure conversion layer 221.

As another example, at least one metal foil layer of the two or more metal foil layers may have a concavo-convex portion including a convex portion and a concave portion on the surface thereof, and the heat-pressure conversion layer may be formed in the concave portion.

Specifically, the electrode current collector may be a structure having a concavo-convex portion including a convex portion and a concave portion on one surface of the metal foil layers facing each other, wherein the heat-pressure conversion layer is formed in the concave portion.

Figure 3:
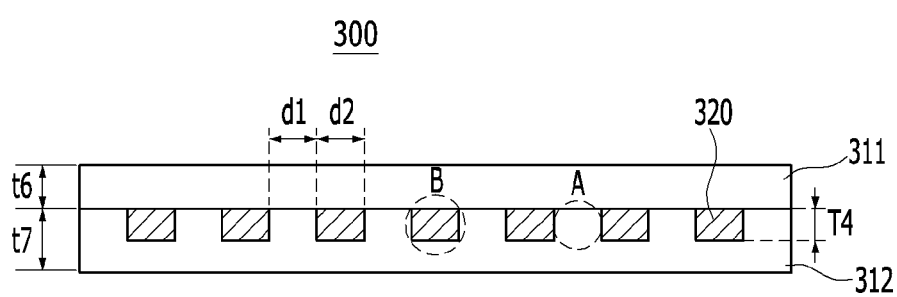
FIG. 3 is a vertical cross-sectional view of an electrode current collector according to another embodiment of the present disclosure.

In order to show such a structure, a vertical cross-sectional view of such electrode current collector is schematically shown in FIG. 3.

Referring to FIG. 3, the electrode current collector 300 according to the present disclosure includes an upper current collector 311, a lower current collector 312, and a heat-pressure conversion layer 320 positioned between the upper current collector 311 and the lower current collector 312.

At this time, the lower current collector 312 has a concave-convex portion including a convex portion A and a concave portion B on the surface, wherein the heat-pressure conversion layer 320 is formed in the concave portion B.

Alternatively, the electrode current collector may be a structure having a concavo-convex portion including a convex portion and a concave portion on the surface of both the metal foil layers facing each other, wherein the heat-pressure conversion layer is formed in the concave portion.

Figure 4:
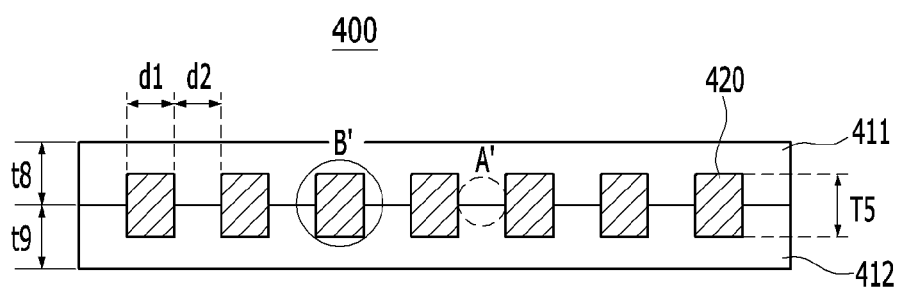
FIG. 4 is a vertical cross-sectional view of an electrode current collector according to yet another embodiment of the present disclosure.

FIG. 4 schematically shows a vertical cross-sectional view of the electrode current collector.

Referring to FIG. 4, the electrode current collector 400 according to the present disclosure has a structure having a concavo-convex portion including a convex portion A' and a concave portion B' on the surfaces of the upper current collector 411 and the lower current collector 412, wherein the convex portions A' face each other, the concave portions B' face each other, and a heat-pressure conversion layer 420 is formed in the concave portions B' facing each other.

Meanwhile, although not shown in the figures, the convex portion of the upper current collector, and the concave portion of the lower current collector may face each other. In this case, a heat-pressure conversion layer may be formed in respective concave portions.

In the case of a metal foil layer which the convex portion and the concave portion are formed as shown in FIGS. 3 and 4, the convex portions A and A' and the concave portions B and B' may be formed at regular intervals d1=d2. Of course, the interval is not limited thereto as long as it is a case including a heat-pressure conversion layer in a sufficient level to exhibit the effect according to the present disclosure, and the interval may be appropriately selected. For example, the intervals d1 and d2 may be 100 µm to 200 µm, respectively.

Meanwhile, when the concave portion and the convex portion are formed in this way, the planar shape of the concave portion is not limited, and may be a linear shape, a circular shape, or a polygonal shape.

Figure 5:
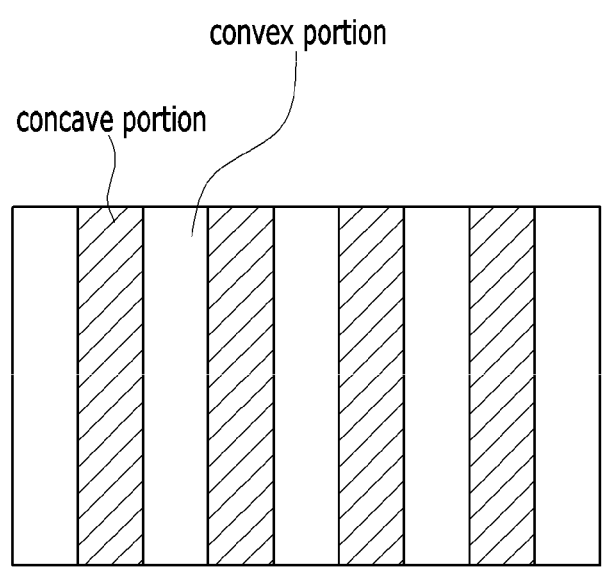
FIG. 5 is a plan view of an electrode current collector according to yet another embodiment of the present disclosure.
Figure 6:
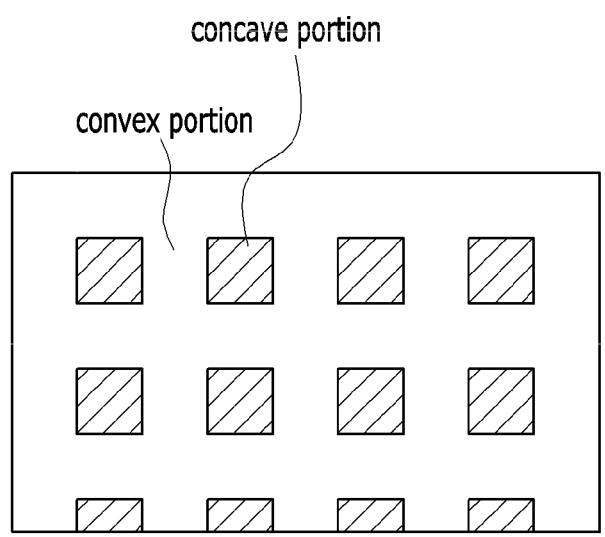
FIG. 6 is a plan view of an electrode current collector according to further embodiment of the present disclosure.
Figure 7:
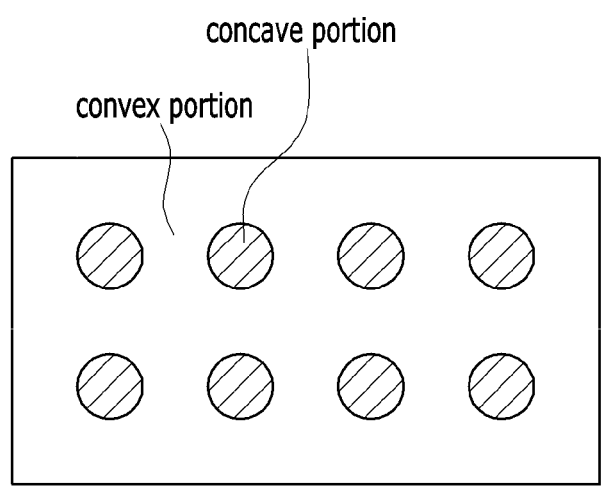
FIG. 7 is a plan view of an electrode current collector according to further embodiment of the present disclosure.

In order to show these examples, FIGS. 5 to 7 show plan views of metal foils having a concave portion and a convex portion.

FIG. 5 shows a case where the planar shape of the concave portion is linear, FIG. 6 shows a case where the planar shape of the concave portion is square, and FIG. 7 shows a case where the planar shape of the concave portion is circle. In the case like FIG. 7, the vertical cross-sectional shape can be a semicircle unlike in FIGS. 3 to 4

In the case of having a concave portion and a convex portion and forming a heat-pressure conversion layer in the concave portion in this way, the entire volume of the current collector due to the interposition of the heat-pressure conversion layer can be reduced, and the respective metal foil layers may also be in direct contact with each other. Thus, it has an advantage that conductivity can be sufficiently secured like the existing single current collector, and thus can prevent deterioration in energy density and output characteristics compared to the volume of a secondary battery including the same.

Meanwhile, regardless of any structure, the two or more metal foil layers are not limited in terms of the material, but copper, stainless steel, aluminum, nickel, titanium, sintered carbon, or copper; stainless steel treated with carbon, nickel, titanium, silver on the surface thereof; aluminum-cadmium alloy, or the like can be used.

The two or more metal foil layers may be selected and used among the above materials, and may be formed of the same or different metals from each other. However, considering that the resistance is increased or the same active material is used on both sides, the metal foil layers may be made of mutually identical metals.

Specifically, when the electrode current collector is used as a positive electrode current collector, the two or more metal foil layers may be made of Al metal. When the electrode current collector is used as a negative electrode current collector, the two or more metal foil layers may be made of Cu metal.

Further, referring back to FIGS. 1 to 4, the thicknesses $t_1$, $t_2$, $t_3$, $t_4$, $t_5$, $t_6$, $t_7$, $t_9$ and $t_9$ of the metal foil layers 111, 112, 211, 212, 213, 311, 312, 411 and 412 may be 10 to 100 µm, respectively.

When the thickness of each of the metal foil layers is too thin outside the above range, output characteristics are reduced, and when the thickness is too thick, the electronic conductivity is too high under non-ideal battery operating conditions, thus causing safety problems, which is not preferable.

Further, the shape of the metal foil layer can increase the binding force of the active material by forming a fine concavo-convex on the surface thereof, and various shapes such as a film, a sheet, a foil, a net, a porous body, a foam body and a non-woven fabric can be used.

Meanwhile, the thicknesses $T_1$, $T_2$, $T_3$, $T_4$, and $T_5$ of the heat-pressure conversion layers 120, 221, 222, 320 and 420 may be 5 to 50 µm, respectively.

When the thickness is too thin outside the above range, it may not act as a heat-pressure conversion layer. When the thickness is too thick, rather, it may act as a resistive layer even during normal operation to reduce electronic conductivity, resulting in an increase in overall volume and a reduction in an energy density per volume, which is not preferable.

Meanwhile, the heat-pressure conversion layers 120, 221, 222, 320, and 420 may include a heat-pressure exchange ceramic material, a conductive material, and an adhesive.

Here, when the heat-pressure exchange ceramic material receives a pressure by a battery case while increasing the volume of the electrode assembly is increasing according to the operation of the secondary battery, more specifically, the charging and discharging of the secondary battery, it can release heat to improve a rapid charging performance.

The heat-pressure exchange ceramic material is not limited as long as it is a material that absorbs and releases pressure or heat while changing its conditions by heat and pressure, but specifically, it can be a trititanium pentoxide.

Specifically, the trititanium pentoxide is a material that undergoes a reversible phase transition between lambda-trititanium pentoxide and beta-trititanium pentoxide by heat and pressure. More specifically, it is a material that undergoes a phase transition from lambda-trititanium pentoxide to beta-trititanium pentoxide by pressurization and undergoes a phase transition from beta-trititanium pentoxide to lambda-trititanium pentoxide by heat absorption.

Figure 8:
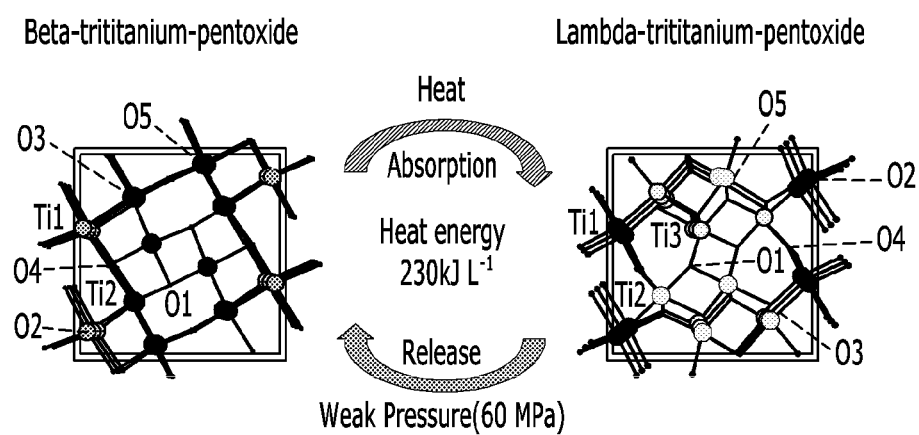
FIG. 8 is a schematic diagram showing the reversible characteristics of the heat-pressure exchange ceramic material of the present disclosure.

This reversibility is schematically illustrated in FIG. 8.

Referring to FIG. 8, the trititanium pentoxide reversibly exists as beta-trititanium pentoxide and lambda-trititanium pentoxide. When a predetermined pressure, a pressure of 60 Mpa or more, is applied to the lambda-trititanium pentoxide, it undergoes a phase transition to beta-trititanium pentoxide while releasing heat of about 230 kJ/L. When beta-trititanium pentoxide absorbs heat, it undergoes a phase transition to lambda-trititanium pentoxide again.

Therefore, in the present disclosure, when a heat-pressure conversion layer is formed by using a lambda-trititanium pentoxide during manufacture of the electrode current collector, while converting to beta-trititanium pentoxide with only a predetermined pressure and releasing heat in the subsequent operation of the secondary battery, the temperature of the lithium secondary battery including the same is improved, thereby increasing the reaction rate and improving a rapid charging performance.

In addition, since such material is reversible, it can be converted back into lambda-trititanium pentoxide either by residual heat or by adding additional heat even after the rapid charging performance, so that it can be reused and can act as a material capable of permanently improving the rapid charging performance.

At this time, the heat-pressure exchange ceramic material may be included in an amount of 20 to 50% by weight based on the total weight of the heat-pressure conversion layer.

When the heat-pressure exchange ceramic material is included in a too small amount outside the above range, heat release due to sufficient predetermined pressure is impossible, and when the heat-pressure exchange ceramic material is included in a too large amount, it may affect the safety of the secondary battery itself by a large amount of heat release, which is not preferable.

The conductive material plays a role in connecting the electronic conductivity of two or more metal foils formed on both sides of the heat-pressure conversion layer.

Such a conductive material is a material that can be used in a general lithium secondary battery, and is not particularly limited as long as a corresponding battery has conductivity without causing a chemical change, and for example, carbon blacks such as carbon black, acetylene black, ketjen black, channel black, furnace black, lamp black, and thermal black; conductive fibers such as carbon fiber and metal fiber; metal powders such as carbon fluoride powder, aluminum powder, and nickel powder; conductive whiskey such as zinc oxide and potassium titanate; conductive metal oxides such as titanium oxide; conductive materials such as polyphenylene derivatives may be used. Specific examples may be at least one selected from the group consisting of carbon-based materials and metal materials.

The conductive material may be included in an amount of 5 to 40% by weight based on the total weight of the heat-pressure conversion layer.

When the conductive material is included in a too small amount outside the above range, sufficient conductivity in the heat-pressure conversion layer cannot be secured, and when the conductive material is included in a too large amount, the safety may be deteriorated by the flow of a large number of electrons, which is not preferable.

Further, the heat-pressure conversion layer must also perform a role of bonding two or more metal foil layers, and thus also includes an adhesive.

The adhesive forms the binding between the metal foil and the heat-pressure conversion layer, and also assists in the binding between the conductive material and the heat-pressure exchange ceramic material.

Such adhesive is not limited as long as it is a component that does not induce a chemical change in the battery. Examples thereof may be at least one selected from the group consisting of polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene terpolymer (EPDM), a sulfonated EPDM, a styrene-butadiene rubber and a fluorine rubber.

The adhesive may be included in an amount of 5 to 40% by weight based on the total weight of the heat-pressure conversion layer.

When the adhesive is included in a too small amount outside the above range, the adhesive force between the heat-pressure conversion layer and the metal foil cannot be secured, and when the adhesive is included in a too large amount, the content of other materials decreases and the resistance may increase, which is not preferable.

As the heat-pressure conversion layer is disposed on the electrode current collector in this way, even if the capacity does not decrease due to the decrease in the content of the active material caused by the inclusion in the electrode mixture, and even if the current density is not increased for a secondary battery with reduced rapid charging performance, the rapid charging performance can be improved.

The present disclosure further provides an electrode in which an electrode mixture containing an electrode active material, a binder, and a conductive material is formed on at least one surface of the electrode current collector.

The electrode current collector has a structure as described above, and the electrode may be a positive electrode and a negative electrode.

When the electrode is a positive electrode, the electrode current collector may be a positive electrode current collector, and may have a structure in which a positive electrode mixture containing a positive electrode active material, a binder, and a conductive material is formed on at least one surface of the positive electrode current collector.

The positive electrode active material may be, for example, a layered compound such as lithium cobalt oxide (LiCoO$_2$) or lithium nickel oxide (LiNiO$_2$) or a compound substituted with one or more transition metals; lithium manganese oxides such as chemical formula Li$_{1+x}$Mn$_{2-x}$O$_4$ (where, x is 0 to 0.33), LiMnO$_3$, LiMn$_2$O$_3$, LiMnO$_2$; lithium copper oxide (Li$_2$CuO$_2$); vanadium oxides such as LiV$_3$O$_8$, LiV$_3$O$_4$, V$_2$O$_5$, and Cu$_2$V$_2$O$_7$; a Ni-site type lithium nickel oxide represented by chemical formula LiNi$_{1-x}$M$_x$O$_2$ (where, M=Co, Mn, Al, Cu, Fe, Mg, B or Ga, and x=0.01 to 0.3); lithium manganese composite oxide represented by chemical formula LiMn$_{2-x}$M$_x$O$_2$ (where, M=Co, Ni, Fe, Cr, Zn or Ta, and x=0.01 to 0.1) or Li$_2$Mn$_3$MO$_8$ (where, M=Fe, Co, Ni, Cu or Zn); LiMn$_2$O$_4$ with a Li portion of chemical formula substituted with an alkaline earth metal ion; a disulfide compound; Fe$_2$(MoO$_4$)$_3$, and the like, but is not limited thereto.

Meanwhile, according to the present disclosure, when the electrode active material is a positive electrode active material, specifically, it may include a lithium transition metal oxide represented by the following chemical formula 1, which is not excellent in the characteristics of rapid charging performance.

$$Li_aNi_{1-x-y}Mn_xCo_yO_{2-b}A_b \quad (1)$$

wherein,

A is an oxygen-substituted halogen, 1.00≤a≤1.05, 0.1≤x≤0.6, 0.1≤y≤0.6, and 0≤b≤0.1

The binder is not limited as long as it is a component that assists in the binding between the active material and the conductive material and in the binding with the current collector. For example, the binder may be selected from polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene terpolymer (EPDM), a sulfonated EPDM, a styrene-butadiene rubber, a fluorine rubber, various copolymers, and the like.

The conductive material is not particularly limited as long as a corresponding battery has conductivity without causing a chemical change in a conventional battery, and for example, carbon blacks such as carbon black, acetylene black, ketjen black, channel black, furnace black, lamp black, and thermal black; conductive fibers such as carbon fiber and metal fiber; metal powders such as carbon fluoride powder, aluminum powder, and nickel powder; conductive whiskey such as zinc oxide and potassium titanate; conductive metal oxides such as titanium oxide; conductive materials such as polyphenylene derivatives may be used.

At this time, the conductive material and the binder may be, respectively, contained in an amount of 0.1 to 30% by weight, specifically, 0.5 to 10% by weight, more specifically, 1 to 5% by weight based on the total weight of the positive electrode mixture.

When the electrode is a negative electrode, the electrode current collector may be a negative electrode current collector, and may be a structure in which a negative electrode mixture containing a negative electrode active material, a binder, and a conductive material is formed on at least one surface of the negative electrode current collector.

The negative electrode active material may include one or more carbon-based materials selected from the group consisting of artificial crystalline graphite, natural crystalline graphite, amorphous hard carbon, low-crystalline soft carbon, carbon black, acetylene black, ketjen black, Super-P, graphene and fibrous carbon, Si-based materials, metal composite oxides such as $Li_xFe_2O_3$ ($0 \leq x \leq 1$), $Li_xWO_2$ ($0 \leq x \leq 1$), $Sn_xMe_{1-x}Me'_yO_z$(Me: Mn, Fe, Pb, Ge; Me': Al, B, P, Si, Group 1, 2, 3 elements in the periodic table, halogen; $0 < x \leq 1$; $1 \leq y \leq 3$; $1 \leq z \leq 8$); lithium metals; lithium alloys; silicon-based alloys; tin-based alloys; metal-based oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; a conductive polymer such as polyacetylene; Li—Co—Ni based materials titanium oxide; lithium titanium oxide, and the like, but are not limited thereto.

However, according to the present disclosure, when the electrode active material is a negative electrode active material, specifically, it may be a silicon-based material that has a large volume change and is easily affected by the heat-pressure exchange ceramic substance of the electrode current collector, Specifically, it may be at least one selected from the group consisting of Si/C composite, SiOx ($0<x<2$), metal-doped SiOx ($0<x<2$), SiOx/C ($0<x<2$), pure Si, and Si-alloy.

The details of the conductive material and the binder are the same as described with respect to the positive electrode, Furthermore, the electrode mixture may optionally further include a filler or the like.

The filler is optionally used as a component for suppressing expansion of a positive electrode, and is not particularly limited as long as the filler is a fibrous material without causing a chemical change in the battery. For example, olefinic polymers such as polyethylene and polypropylene, and fibrous materials such as glass fibers and carbon fibers are used.

The present disclosure further provides a lithium secondary battery in which the electrode assembly including the electrode is built in a battery case together with a lithium-containing non-aqueous electrolyte.

Here, the electrode assembly includes an electrode according to the present disclosure, a counter electrode and a separator interposed therebetween.

At this time, when the electrode is a positive electrode, the counter electrode is a negative electrode, and when the electrode is a negative electrode, the counter electrode is a positive electrode.

Further, in this case, the electrode current collector of the counter electrode may be a conventionally disclosed electrode current collector, or may be the same as the structure according to the present disclosure.

Further, as the active material of the counter electrode, the active material as described above can be used.

For example, when the active material contained in the electrode according to the present disclosure includes a lithium transition metal oxide represented by the chemical formula 1, the active material contained in the counter electrode may include a silicon-based material. Alternatively, when the active material contained in the electrode according to the present disclosure includes a silicon-based material, the active material contained in the counter electrode may include a lithium transition metal oxide represented by the chemical formula 1.

That is, even when the counter electrode is the conventionally disclosed electrode current collector, the active material can be a combination of the above.

That is, the electrode current collector according to the present disclosure, can, regardless of where it is used as the positive electrode and/or the negative electrode, exhibit the effect when the volume expansion is made according to the charge and discharge of the secondary battery.

Meanwhile, as the separator interposed between the electrode and the counter electrode, an insulating thin film having high ion permeability and mechanical strength is used. A pore diameter of the separator is generally 0.01 to 10 μm and a thickness thereof is generally 5 to 300 μm. Olefin-based polymers such as polypropylene, which is chemically resistant and hydrophobic; a sheet or a non-woven fabric made of glass fiber, polyethylene or the like may be used as an example of the separator. When a solid electrolyte such as a polymer is used as the electrolyte, the solid electrolyte may also serve as a separator.

The non-aqueous electrolyte containing a lithium salt may include a non-aqueous electrolyte and a lithium salt.

As examples of the non-aqueous organic solvent, mention may be made of non-protic organic solvents, such as N-methyl-2-pyrollidinone, propylene carbonate, ethylene carbonate, butylene carbonate, dimethyl carbonate, diethyl carbonate, gamma-butyro lactone, 1,2-dimethoxy ethane, tetrahydroxyfuran, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

The lithium salt is a material that is readily soluble in the above-mentioned non-aqueous electrolyte. The lithium salt may include, for example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate, and imide.

If necessary, an organic solid electrolyte, an inorganic solid electrolyte, or the like may be used.

Examples of the organic solid electrolyte include polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

Examples of the inorganic solid electrolyte include nitrides, halides and sulfates of lithium (Li) such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, $Li_3PO_4$—$Li_2S$—$SiS_2$.

In addition, for the purpose of improving charge and discharge characteristics, flame retardancy and the like, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like may be added to the non-aqueous electrolyte. In some cases, in order to impart incombustibility, the electrolyte may further include halogen-containing solvents, such as carbon tetrachloride and ethylene trifluoride. Furthermore, in order to improve high-temperature retention characteristics, the electrolyte may further include carbon dioxide gas.

The battery case is not limited as long as it has a structure capable of incorporating an electrode assembly, and may be a pouch type battery case, and a prismatic or cylindrical battery case made of metal can which are conventionally known in the art. In detail, it may be a prismatic or cylindrical battery case made of metal to facilitate the operation of the heat-pressure conversion layer.

The lithium secondary battery can be included as an unit battery of the devices, and the devices may be selected from the group consisting of a mobile phone, a portable computer, a smart phone, a tablet PC, a smart pad, a netbook computer, a light electronic vehicle (LEV), an electric vehicle, a hybrid electric vehicle, a plug-in hybrid electric vehicle, and a power storage apparatus.

The structure and manufacturing method of the device are well known in the art to which the present disclosure pertains, and therefore a detailed description thereof will be omitted.

Although the exemplary embodiments of the present disclosure have been disclosed for illustrative purposes, those skilled in the art will appreciate that various application and modifications can be made, without departing from the scope and spirit of the invention as disclosed in the accompanying claims.

INDUSTRIAL APPLICABILITY

As described above, in the electrode current collector according to the present disclosure, as a heat-pressure conversion layer containing a heat-pressure exchange ceramic material is disposed between two or more metal foils, when the pressure in the battery increases by the operation of the secondary battery, it releases heat from the pressure-heat exchange ceramic material to raise the temperature of the secondary battery, thereby exhibiting the effect of improving the rapid charging performance.

The invention claimed is:

1. An electrode current collector for a lithium secondary battery, comprising:
   two or more metal foil layers, and
   a heat-pressure conversion layer positioned between the two or more metal foil layers,
   wherein the heat-pressure conversion layer includes a heat-pressure exchange ceramic material, a conductive material, and an adhesive, and
   wherein the heat-pressure exchange ceramic material is trititanium pentoxide.

2. The electrode current collector according to claim 1, wherein the heat-pressure conversion layer is interposed between two or more flat metal foil layers.

3. The electrode current collector according to claim 2, wherein the electrode current collector includes a lower current collector, a first heat-pressure conversion layer located on the lower current collector, an intermediate current collector located on the first heat-pressure conversion layer, a second heat-pressure conversion layer located on the intermediate current collector, and an upper current collector located on the second heat-pressure conversion layer.

4. The electrode current collector according to claim 1, wherein at least one metal foil layer of the two or more metal foil layers has a concavo-convex portion including a convex portion and a concave portion on the surface thereof, and a heat-pressure conversion layer is formed in the concave portion.

5. The electrode current collector according to claim 4, wherein the convex portion and the concave portion are formed at regular intervals.

6. The electrode current collector according to claim 1, wherein the heat-pressure exchange ceramic material undergoes a reversible phase transition between lambda-trititanium pentoxide and beta-trititanium pentoxide by heat and pressure.

7. The electrode current collector according to claim 1, wherein the heat-pressure conversion layer has a thickness of 5 to 50 μm.

8. The electrode current collector according to claim 1, wherein the two or more metal foil layers are made of Al metal, and the electrode current collector is a positive electrode current collector.

9. The electrode current collector according to claim 1, wherein the two or more metal foil layers are made of Cu metal, and the electrode current collector is a negative electrode current collector.

10. The electrode current collector according to claim 1, wherein the two or more metal foil layers have a thickness of 10 to 100 μm, respectively.

11. An electrode comprising an electrode mixture containing an electrode active material, a binder and a conductive material formed on at least one surface of the electrode current collector according to claim 1.

12. The electrode according to claim 11, wherein the electrode active material includes a lithium transition metal oxide represented by the following chemical formula 1.

$$Li_aNi_{1-x-y}Mn_xCo_yO_{2-b}A_b \quad (1)$$

wherein,
A is an oxygen-substituted halogen,
$1.00 \le a \le 1.05$, $0.1 \le x \le 0.6$, $0.1 \le y \le 0.6$, and $0 \le b \le 0.1$.

13. The electrode according to claim 11, wherein the electrode active material includes one or more silicon-based materials selected from the group consisting of Si/C composite, $SiO_x(0<x<2)$, metal-doped $SiO_x(0<x<2)$, $SiO_x/C$ $(0<x<2)$, pure Si, and Si-alloy.

14. A lithium secondary battery comprising:
   an electrode assembly including the electrode according to claim 11 and a lithium-containing non-aqueous electrolyte, wherein the electrode assembly is in a prismatic or cylindrical battery case made of metal.

15. An electrode current collector for a lithium secondary battery, comprising:
    two or more metal foil layers, and
    a heat-pressure conversion layer positioned between the two or more metal foil layers,
    wherein the heat-pressure conversion layer includes a heat-pressure exchange ceramic material, a conductive material, and an adhesive, and
    wherein the heat-pressure exchange ceramic material undergoes a reversible phase transition between lambda-trititanium pentoxide and beta-trititanium pentoxide by heat and pressure.

16. An electrode current collector for a lithium secondary battery, comprising:
    two or more metal foil layers, and
    a heat-pressure conversion layer positioned between the two or more metal foil layers,
    wherein the heat-pressure conversion layer includes a heat-pressure exchange ceramic material, a conductive material, and an adhesive, and
    wherein the electrode current collector includes a lower current collector, a first heat-pressure conversion layer located on the lower current collector, an intermediate current collector located on the first heat-pressure conversion layer, a second heat-pressure conversion layer located on the intermediate current collector, and an upper current collector located on the second heat-pressure conversion layer.

* * * * *